United States Patent [19]
de Groot et al.

[11] Patent Number: 4,927,263
[45] Date of Patent: May 22, 1990

[54] POSITION AND VELOCITY IMAGING SYSTEM USING 2-D LASER DIODE ARRAY

[75] Inventors: Peter J. de Groot; Steven H. Macomber, both of Bethel; Gregg M. Gallatin, Monroe, all of Conn.

[73] Assignee: The Perkin-Elmer Corporation, Norwalk, Conn.

[21] Appl. No.: 232,074

[22] Filed: Aug. 15, 1988

[51] Int. Cl.⁵ .................. G01C 3/08; G01N 21/00; G06K 9/46
[52] U.S. Cl. .................................... 356/5; 356/2; 356/4.5; 356/28.5; 356/342; 356/343; 356/349; 356/376; 250/550; 382/29
[58] Field of Search .............. 356/2, 4, 5, 342, 343, 356/349, 376, 28, 28.5, 152; 250/550; 382/10, 16, 28, 29

[56] References Cited

U.S. PATENT DOCUMENTS

| | | | |
|---|---|---|---|
| 4,168,906 | 9/1979 | Schwiesow | 356/28 |
| 4,589,070 | 5/1986 | Kyrazis | 356/28.5 X |
| 4,600,301 | 7/1986 | Snyder | 356/28.5 |
| 4,666,295 | 5/1987 | Duvall, III et al. | 356/5 |
| 4,744,653 | 5/1988 | Sano et al. | 356/5 |

OTHER PUBLICATIONS

G. Beheim and K. Fritsch Range Finding Using Frequency-Modulated Laser Diode, Applied Optics, vol. 25, No. 9, May 1986, pp. 1439–1442.
S. Shinohara et al., Laser Doppler Velocimeter Using the Self-Mixing Effect of a Semiconductor Laser Diode, Applied Optics, vol. 25, No. 9, May 1986, pp. 1417–1419.
E. Shimizu, Directional Discrimination in the Self-Mixing Type Laser Doppler Velocimeter, Applied Optics, vol. 26, No. 21, Nov. 1987, pp. 4541–4544.
H. Jentink et al., Small Laser Doppler Velocimeter Based on the Self-Mixing Effect in a Diode Laser, Applied Optics, vol. 27, No. 2, Jan. 1988, pp. 379–385.
J. Chumside et al., Laser Doppler Velocimetry by Modulating a $CO_2$ Laser with Backscattered Light, Applied Optics, vol. 23, No. 1, Jan. 1984, pp. 61–66.
W. Cathey et al., Vision System with Ranging for Maneuvering in Space, Optical Engineering, vol. 25, No. 7, Jul. 1986, pp. 821–824.

*Primary Examiner*—Thomas H. Tarcza
*Assistant Examiner*—Linda J. Wallace
*Attorney, Agent, or Firm*—Edwin T. Grimes; Thomas P. Murphy

[57] ABSTRACT

An optical radar system for coherent ranging and velocimetry. Modulation of a laser diode by light backscattered from a target is used to determine distance and velocity of a target. An array of laser diodes are used to determine the velocity and topography of a target. Three laser diodes are used to determine speed and orientation of a rotating disk.

8 Claims, 1 Drawing Sheet

POSITION AND VELOCITY IMAGING SYSTEM USING 2-D LASER DIODE ARRAY

BACKGROUND OF THE INVENTION

Optical ranging and velocimetry systems became viable with the advent of the laser. However, coherent detection systems, i.e., systems which utilize laser beams have heretofore involved some variation of unequal path interferometry. While such systems have proven successful, they are burdened with complex precision optics, large size and sensitive alignment. While laser diodes have lessened the cost and complexity of such systems, many of the problems, e.g. complex optics and sensitive alignment problems persist.

However, it has been discovered that the problems of complex optics and alignment sensitivity may be overcome by utilizing the laser light backscattered from a target to directly modulate the source laser. In other words, the scattered light is focussed back into the laser gain medium. The doppler shifted backscattered light produces a beat frequency with the source light. The beat frequency is related to target velocity by the doppler effect and can be related to target distance by frequency modulation of the source light as in the chirp radar technique.

The above system of mixing the backscattered light with the laser source light referred to sometimes as the "self-mixing" method requires only one common lens and is self-aligning.

The present invention makes use of the above discussed techniques in carrying out its objectives.

BRIEF SUMMARY OF THE INVENTION

The present invention comprises an array of laser diodes. Each of the diodes transmits a frequency modulated beam through an imaging lens to a target. The backscattered light from each impingement point on the target is reimaged at its source diode to generate a signal indicative of the range and velocity of the impingement point. The signals are processed to provide real time information of the velocity and range profile of the target.

In a special case of the present invention a three diode array system is used to determine speed and orientation of a rotating disk.

DESCRIPTION

FIG. 1 illustrates a compact self mixing laser velocimeter 10. It comprises a single laser diode 11 shown in schematic. It is powered by a d.c. power supply 12. The laser diode 11, which may be a Sharp LT 015 MD, emits light of essentially a single frequency. The emitted light or laser beam is collimated and directed onto a moving target 14 by lens 13. The target reflects or backscatters the light back through the lens 13 which focuses it onto the laser's gain medium. Since the target is moving, the backscattered light has a different frequency than the transmitted light. When the backscattered light is injected into the laser diode 11, a beat frequency is produced which due to the doppler effect is related to the relative velocity of the target toward or away from the laser diode 11.

A photodetector 15 senses the beat frequency of the light and converts it to an electrical signal and connects it to a spectrum analyzer 16 which determines target velocity. By frequency modulating the transmitted laser distance of the target may also be determined using, e.g., chirp radar techniques.

It should be noted that the backscattered light actually enters the front or emitting facet of the laser diode 11 and the photodetector 15 senses the light at the back facet of the laser diode 11.

The foregoing description of a known type of laser diode velocimeter is used to illustrate a well-known concept useful in understanding the present invention.

Figure 1:
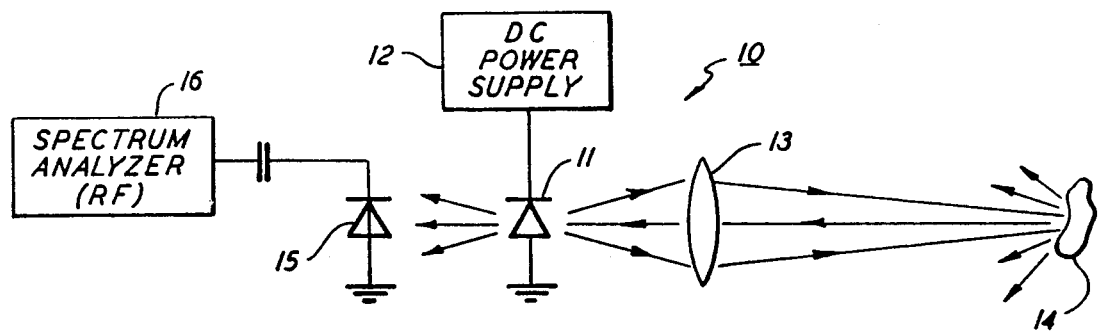
FIG. 1 is a schematic illustration of a self-mixing laser diode velocimeter.
Figure 2:
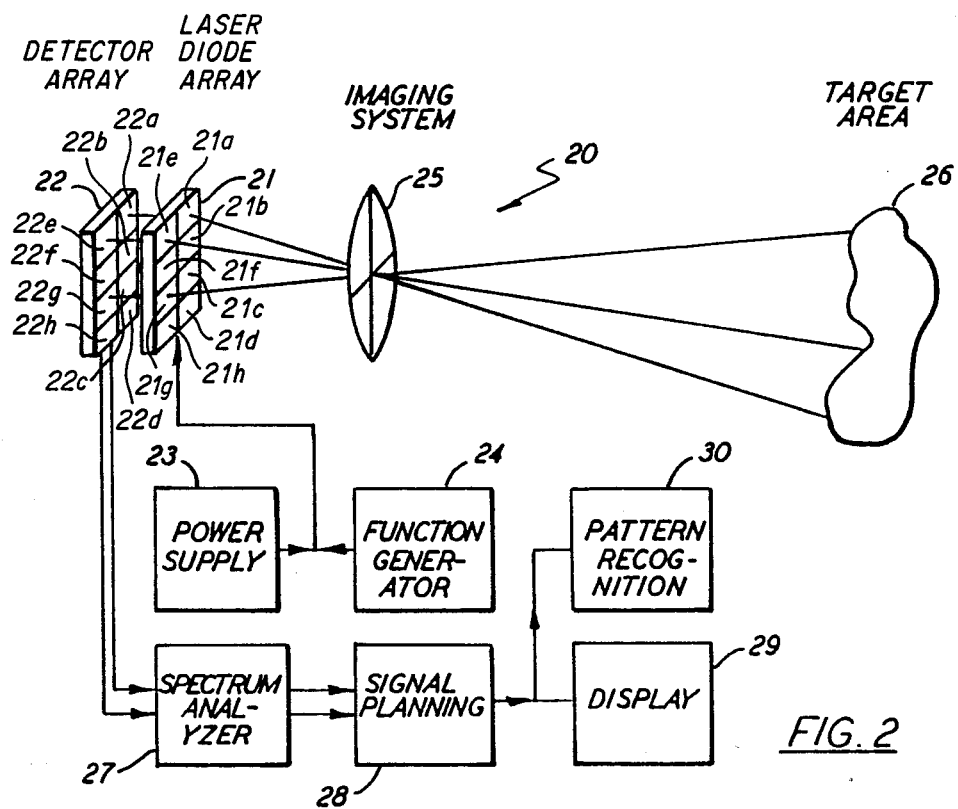
FIG. 2 is an illustration of the position and velocity imaging system of the present invention.

FIG. 2 illustrates the position and velocity imaging system 20 of the present invention. It comprises an array 21 of discrete laser diodes. The array 21 may comprise any number of laser diodes with the total number determined by factors such as target size and/or resolution desired. For present purposes array 21 may comprise eight laser diodes $21a-21h$. A photodetector array 22 comprises a like number $22a-22h$ of photodetectors with each one positioned at the back facet of its corresponding laser diode to sense and convert into electrical signals the light variations in its respective laser diode.

A power supply 23 and function generator 24 provide a composite signal to each of the laser diodes $21a-21h$. The function generator 24 imposes a triangle-wave signal onto the d.c. bias provided by power supply and the composite signal is applied to each laser diode $21a-21h$ to energize and frequency modulate each.

A single collimating lens 25 is disposed between the laser diode array 21 and the target 26. The laser beam from any particular laser diode $21a-21h$ is returned to its associated laser diode as reflected backscattered light and modulates that laser diode such that the velocity and range of its associated point on the target can be determined. The lens 25 focuses the backscattered light on its associated laser diode without requirement of any special alignment or complex optics. Since the backscatter light modulates the diode directly, coherence between the backscattered and the source light is required. Background light from other diodes can modulate the laser. But, the geometry of the set-up can be such that the maximum backscatter light into each laser comes from that laser. Also, frequency diode references and coherence differences minimize the effect of backscatter light from other lasers. Special alignment is not required because a lens that focuses the laser light on a target will necessarily focus backscatter light onto the laser front facet. These properties of the design simplify the optics.

The photodetectors $22a-22h$ convert the velocity and range containing optical information from their counterpart laser diodes $21a-21h$ to electrical signals and applies them to spectrum analyzer 27. The output of spectrum analyzer 27 is connected to signal processor 28 which in turn is connected to a display 29 or pattern recognition circuit 30.

As aforesaid the backscatter light from the i'th target point is mixed with the source light of its corresponding laser diode producing beat signals of frequency $f_b{}^i$.

The beat signals of each laser diode are processed to provide a display or image of the target topography and velocity distribution in display 29. The processed signal data may also be compared with stored data in a pattern recognition circuit 30 for specific object identification.

The "processing" consists of analyzing the frequency content of the signal from each photodetector. The beat frequency is determined and the corresponding range and/or velocity is calculated. The processed data is stored as a range velocity value for every target point interrogated. These values may be compared point by point with previously stored data for object identification.

The velocity signals produced by doppler shift of the backscattered light is:

$$f_v^i = 2 \frac{v^i}{c} f_1 \ (v^i << c)$$

The ranging and topography signals produced by triangle wave current modulation is:

$$f_R^i = K l^i A f_T$$

where
K = a characteristic constant of the laser diode
$l^i$ = target distance ($i^{th}$ point)
A = amplitude of the triangle wave current modulation
$f_T$ = frequency of the triangle wave
$f_1^i$ = laser frequency
$V^i$ = target speed ($i^{th}$ point)
C = speed of light The beat signal is:

$$f_b^i = f_v^i + f_R^i$$

$f_R^i$ is alternately positive and negative, corresponding to the positive and negative slopes of the triangle wave modulation. The processing detects two beat signals, one for positive and one for negative $f_R^i$; and the average gives $f_v^i$ and the difference is $2f_R^i$. Then $$v^i = \frac{c}{2} f_v/f_1$$

$$l^i = (f_R/f_T)(1/KA)$$

Figure 3:
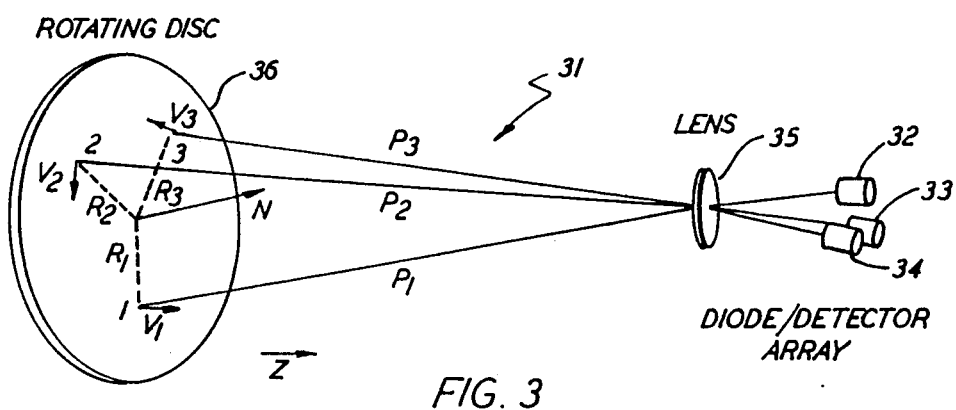
FIG. 3 illustrates an arrangement for determining speed and orientation of a rotating disk.

FIG. 3 illustrates a special embodiment 31 of the present invention. It comprises a three element radar array. Each element comprises a combination laser diode-photodetector 32, 33 and 34. A lens 35 is disposed between the array and a disk 36. Laser diode-photodetectors 32, 33 and 34 have inputs similar to the laser diode array 21 of FIG. 2.

P₁, P₂ and P₃ represent the distances of laser diode-photodetectors 32, 33 and 34 from respective impingement points 1, 2 and 3 on the disk 36.

V₁, V₂ and V₃ represent the velocities of points 1, 2 and 3 at distances R₁ R₂ and R₃, respectively about the normal N, to the disk 36.

The distance and velocity measurements taken simultaneously by laser diode-photodetectors 32, 33 and 34 to the three points are sufficient to uniquely determine both the speed and orientation of the disk 36 with no other data.

The required distance and velocity measurements would be made in a manner similar to and with the same type of apparatus as that described in connection with FIG. 2. The distance and velocity measurements, themselves, would be processed by conventional means to provide orientation, i.e. the norml, N, to the disk 36 and the rotational speed, w, of the disk 36.

FIG. 3 shows the geometry for the disk measurement performed by the 3-element laser radar array. The radar determines the position vectors $P_i$ and the components $V_i . P_i$ of the velocity vectors, where $P_i$ is the unit vector along $P_i$. The perpendicular to the disk is defined by the normalized cross product of the two difference vectors $(P_1 - P_2)$ and $(P_2 - P_3)$ parallel to the plane of the disk:

$$N = \frac{(P_1 - P_2) \times (P_2 - P_3)}{|(P_1 - P_2) \times (P_2 - P_3)|}$$

The rotation speed $\omega$ is found as follows. The velocity vector $V_i$ for point i = {1, 2, 3} in terms of the rotation speed $\omega$, the vector N and the radius vector R from the center of rotation is:

$$V_i = \omega N \times R_i$$

Thus $$(V_j - V_i) = \omega N \times (R_j - R_i),$$

and $$(V_j - V_i) = \omega N \times (P_j - P_i).$$

Solving for $\omega$ using the $\hat{Z}$ component of this equation yields:

$$\omega = \frac{\hat{Z} \cdot (V_j - V_i)}{\hat{Z} \cdot (N \times (P_j - P_i))}$$

The right hand term can be experimentally determined by any two radar measurements made along the $\hat{Z}$ axis. In the geometry of FIG. 3, we can make the approximation:

$$\hat{Z} . V_i \approx \hat{P}_i V_j$$

so that $$\omega = \frac{(P_j V_j - P \cdot V_i)}{ZN \times (P_j - P_i)}$$

The right-hand member is expressed in terms of measured quantities and $\omega$ is uniquely determined. The approximation improves with target distance if the separation of the measuring points is held constant. It is interesting to note that the center of rotation is not uniquely determined by these calculations. This is because the foregoing equation defines a locus of possible center points.

The algorithm verified experimentally for a 6-inch disk in several arbitrary positions at a distance of about 1 meter. The accuracy of the measurement is limited by the range resolution, but for disk angles greater than 15 degrees, the laboratory test system is able to determine the disk orientation and rotation speed to an accuracy of +/−25%.

Other modifications of the present invention are possible in light of the above description which should not be construed as placing any limitations on the invention beyond those set forth in the claims which follow.

What is claimed is:

1. An optical radar system for determining range and velocity information of a target comprising
    a plurality of laser diodes for emitting a plurality of laser beams to a target;
    a plurality of photodetectors, each responsive to one of said laser diodes for sensing variations therein caused by light which is from the one of said laser diodes and which is backscattered from the target;
    processing means connected to each photodetector for calculating range and velocity information of the target.

2. An optical radar system according to claim 1 further comprising:
    means to frequency modulate each of the emitted beams.

3. An optical radar system according to claim 2 further comprising:
    a single lens disposed between the laser diodes and the target for focussing the emitted beam from each laser diode at a specific point on the target and refocussing backscattered light reflected from said specific point back to the emitting laser diode.

4. An optical radar system according to claim 3 wherein:
    said laser diodes and photodetectors form a triangular array of three;
    said target is a disk;
    said processing means determines orientation and angular velocity of said disk.

5. An optical radar system according to claim 3 wherein:
    said plurality of laser diodes and photodetectors are formed in a rectangular array;
    said processing means determines the topography and velocity of said target.

6. An optical radar system according to claim 5 wherein said processing means comprises:
    spectrum analyzer means providing signals representative of the velocity and range of each point of the target receiving a beam;
    signal processing means connected to said spectrum analyzer providing a range and velocity profile of said target.

7. An optical radar system according to claim 6 further comprising:
    display means connected to said signal processing means for displaying an image of the topography and velocity profile of said target.

8. An optical radar system according to claim 7 further comprising:
    pattern recognition circuit means connected to said signal processing means;
    said pattern recognition circuit means storing specific object identification data for comparison with the topography and velocity profile data of the target.

* * * * *